A. Millochau
Thermometer.
N° 49,777.   Patented Sep. 5, 1865.
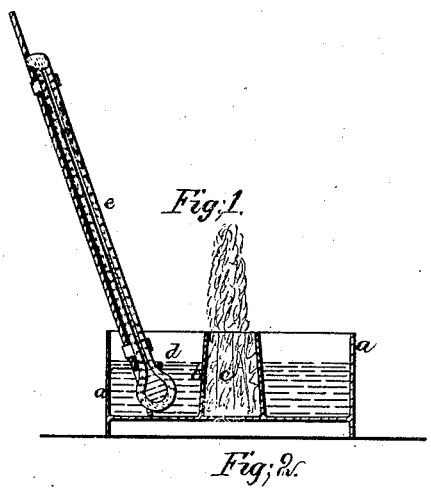
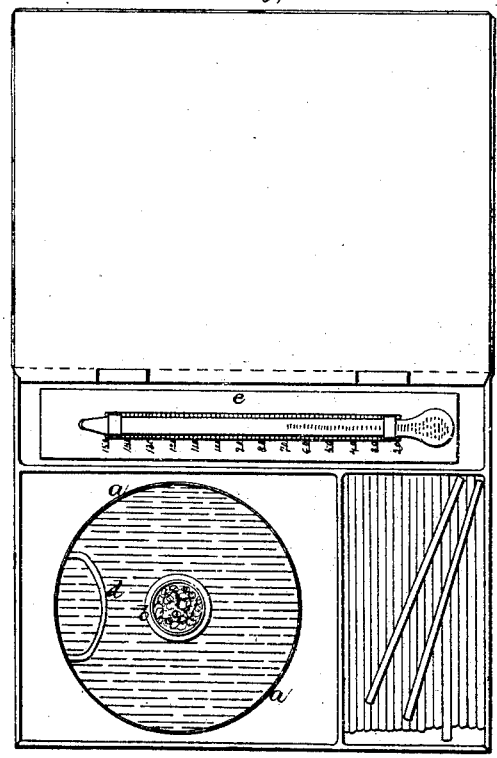
Witnesses.
Lemuel W. Serrell
Chas. H. Smith
Inventor:
A. Millochau

UNITED STATES PATENT OFFICE.

ADOLPH MILLOCHAU, OF JERSEY CITY, NEW JERSEY.

IMPROVED INSTRUMENT FOR TESTING PETROLEUM.

Specification forming part of Letters Patent No. 49,777, dated September 5, 1865.

*To all whom it may concern:*

Be it known that I, ADOLPH MILLOCHAU, of Jersey City, in the county of Hudson and State of New Jersey, have invented, made, and applied to use a certain new and useful Improvement in Fire-Testers for Petroleum, &c.; and I do hereby declare the following to be a full, clear, and exact description of the same, reference being had to the annexed drawings, making part of this specification, wherein—

Figure 1 is a vertical section of my tester as in use, and Fig. 2 is a plan of the same as introduced in a box for transportation.

Similar marks of reference denote the same parts.

An apparatus has heretofore been made in which the heat of petroleum could be determined when exposed to heat for inflaming the same, but such apparatus is inconvenient and costly.

The nature of my said invention consists in an oil-receptacle containing a burner that heats and inflames the oil, in combination with a thermometer introduced into the oil to indicate the temperature at which the oil catches fire upon its surface, and thus test the quality and the inflammability of the oil.

In the drawings, *a* is a cup or receptacle, that should be of metal. *b* is a wick-tube or burner, introduced near the middle of the cup *a*, and provided with openings through the sides of the tube, so that the oil has free access to the wick *c* contained in said tube *b*.

*d* is a loop of wire attached to the inside of the cup, and of a size to receive and hold the thermometer *e*, as represented in Fig. 1, the bulb of said thermometer being near the surface of the oil which is contained in said vessel or cup.

The operation is as follows: The parts being in the position represented in Fig. 1 and the necessary amount of oil supplied to the cup, a light is used to inflame the wick *c*. The heat thus generated is communicated through the tube *b* to the oil in the cup, the temperature of which is raised until vapors pass off therefrom and the light immediately inflames them and they burn from the surface of the oil. The temperature of the oil is denoted by the thermometer, so that point at which inflammable gases are evolved is indicated with precision.

This apparatus, for convenience of transportation, may be placed in a box, as represented in Fig. 2, the thermometer being lifted out from behind the loop *d* and laid in a space provided for it, as shown.

I have found that the oil in the receptacle *a* should be slightly below the upper end of the wick-tube, and the loop *d* should be attached at the proper place to indicate the height to which the receptacle is to be filled.

What I claim, and desire to secure by Letters Patent, is—

The oil-receptacle containing a wick-tube or burner to heat and inflame the petroleum or other oil, in combination with the thermometer introduced into such receptacle, for the purposes and as specified.

In witness whereof I have hereunto set my signature this 19th day of September, 1864.

A. MILLOCHAU.

Witnesses:
LEMUEL W. SERRELL,
CHAS. H. SMITH.